United States Patent
Pan

(10) Patent No.: US 9,971,477 B2
(45) Date of Patent: May 15, 2018

(54) METHOD AND APPARATUS FOR AUTOMATICALLY SWITCHING DISPLAYED LIST BASED ON CATEGORIES

(71) Applicant: Alibaba Group Holding Limited, Grand Cayman (KY)

(72) Inventor: Jia Pan, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 258 days.

(21) Appl. No.: 14/939,392

(22) Filed: Nov. 12, 2015

(65) Prior Publication Data

US 2016/0139743 A1    May 19, 2016

(30) Foreign Application Priority Data

Nov. 13, 2014   (CN) .......................... 2014 1 0639673

(51) Int. Cl.
| | |
|---|---|
| *G06F 17/30* | (2006.01) |
| *G06F 3/0482* | (2013.01) |
| *G06F 3/0484* | (2013.01) |
| *G06F 3/0485* | (2013.01) |
| *H04L 29/08* | (2006.01) |

(52) U.S. Cl.
CPC .......... *G06F 3/0482* (2013.01); *G06F 3/0485* (2013.01); *G06F 3/04847* (2013.01); *G06F 17/3089* (2013.01); *G06F 17/30873* (2013.01); *H04L 67/02* (2013.01)

(58) Field of Classification Search
CPC ............... H04L 67/02; G06F 17/3089; G06F 17/30873; G06Q 30/0601; G06Q 30/0643
USPC ........................ 715/234, 739; 705/7.29, 27.2
See application file for complete search history.

(56) References Cited

U.S. PATENT DOCUMENTS

| | | |
|---|---|---|
| 6,920,445 B2 | 7/2005 | Bae |
| 7,992,102 B1 | 8/2011 | De Angelo |
| 8,769,430 B2 | 7/2014 | Miller et al. |
| 8,887,085 B1 | 11/2014 | Cox et al. |
| 9,075,516 B2 | 7/2015 | Ishihara et al. |
| 2001/0030666 A1 | 10/2001 | Okada |
| 2008/0005701 A1* | 1/2008 | Park ..................... G06F 3/0482 715/841 |
| 2009/0049471 A1 | 2/2009 | Kamiya |
| 2012/0042277 A1* | 2/2012 | Lin-Hendel .......... G06F 3/0482 715/784 |
| 2012/0124523 A1 | 5/2012 | Zhang et al. |

(Continued)

OTHER PUBLICATIONS

PCT Search Report and Written Opinion dated Feb. 4, 2016 for PCT Application No. PCT/US15/60321, 7 pages.

*Primary Examiner* — Rinna Yi
(74) *Attorney, Agent, or Firm* — Lee & Hayes, PLLC

(57) ABSTRACT

A method and an apparatus for browsing an object list are disclosed. The method includes providing an object list, wherein the object list includes a first region and a second region, multiple first-level categories are displayed in the first region, and multiple second-level categories are displayed in the second region; obtaining a status of the object list, and determining whether the status of the object list meets a preset condition; and performing a switching control on a second-level category displayed in the second region based on a status of the second-level category displayed in the second region upon determining that the status of the object list meets the preset condition.

15 Claims, 7 Drawing Sheets

(56) References Cited

U.S. PATENT DOCUMENTS

2012/0311441 A1 12/2012 Reyna et al.
2013/0185676 A1 7/2013 Cao
2014/0304641 A1 10/2014 Kim

* cited by examiner

METHOD AND APPARATUS FOR AUTOMATICALLY SWITCHING DISPLAYED LIST BASED ON CATEGORIES

CROSS REFERENCE TO RELATED PATENT APPLICATION

This application claims foreign priority to Chinese Patent Application No. 201410639673.1 filed on Nov. 13, 2014, entitled "Control Method and Apparatus for Browsing a List of Objects", which is hereby incorporated by reference in its entirety.

TECHNICAL FIELD

The present disclosure relates to the field of Internet technologies, and particularly, to methods and apparatuses for browsing a list of objects.

BACKGROUND

In online scenarios, products are typically organized in a category manner, for example, first-level categories, second-level categories, etc., to facilitate a user to browse a list of products and locate a target one. In an event that a large number of products exist on a webpage, browsing the webpage requires a large amount of time, resulting in poor page performance and user experience. If different categories correspond to different lists, the browsing activity of the user is interrupted after products under a current category have been loaded and browsed. Typically, manual operation (e.g., mouse clicking) is performed to switch from one category to another category to continue the browsing. Therefore, an interaction method is desired to satisfy a demand of the user to browse all the products without hindrance.

Traditionally, a solution commonly used in the browser area is to place all products into a list and to locate a corresponding block using a category anchor point, in order to achieve barrier-free browsing for a user.

By using the foregoing implementation, a user's demand for barrier-free browsing may be achieved when there are a small number of products. However, when the number of products is in the order of thousands, the page performance becomes poor in quality when all the products are loaded at once, and a page thereof is very long. In general, optimization may be performed through the following two optimization schemes:

(1) Product information in a page is loaded in a cascading manner; however, such manner will lead to a number of problems when categories are used as anchor points:

a) different categories are mixed together;

b) blank areas appear in the page, leading to cascading in both up and down directions and thus affecting user experience; and c) the page is still very long; and (2) Category anchor points are changed to Tabs for switching; however, since lists of products under each sub-category are independent from one another, a user needs to manually perform clicking and switching when the user wants to browse products under other categories, thus increasing the number of operations of the user.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Objectives of the present disclosure are to solve one of the technical problems in related technologies at least to some extent.

Accordingly, a first objective of the present disclosure is to provide a control method for browsing a list of objects. The method may cause categories in a page to be clearly differentiated, having an excellent page performance. From the perspective of a user, a browsing activity of the user is not interrupted, thus achieving the user's demand for barrier-free browsing, and enhancing user experience.

A second objective of the present disclosure is to provide a control apparatus for browsing a list of objects.

In order to achieve the foregoing objectives, according to a first embodiment of the present disclosure, a control method for browsing a list of objects may include providing a product list, the product list including a first region and a second region, where multiple first-level categories are displayed in the first region, and multiple second-level categories are displayed in the second region; obtaining a status of the product list, and determining whether the status of the product list meets a preset condition; and performing a switching control for a second-level category displayed in the second region based on a status of the second-level category in the second region in response to the status of the product list meeting the preset condition.

In the control method for browsing a list of objects that is provided by the embodiment of the present disclosure, a product list may be provided. The product list may include a first region and a second region. Multiple first-level categories are displayed in the first region, and multiple second-level categories are displayed in the second region. A status of the product list may be obtained, and a determination may be made as to whether the status of the product list meets a preset condition. In an event that the status of the product list meets the preset condition, a switching control may be performed for a second-level category displayed in the second region based on a status of the second-level category in the second region. In other words, in response to determining that the product list meets the preset condition and fulfills an automatic switching operation, a target category to be switched is determined based on a status of a second-level category that is currently displayed in the second region, so as to achieve an automatic switching between categories in a page, without a need of interrupting a browsing activity of a user, thus achieving the users' demand for barrier-free browsing in a better manner, and enhancing user experience. From the perspective of the page, categories in the page are differentiated clearly, and page performance is improved.

In order to achieve the foregoing objectives, according to a second embodiment of the present disclosure, a control apparatus for browsing a list of objects may include a provision module used for providing a product list, the product list including a first region and a second region, where multiple first-level categories are displayed in the first region, and multiple second-level categories are displayed in the second region; an acquisition module used for obtaining a status of the product list; a determination module used for determining whether the status of the product list meets a preset condition; and a control module used for performing a switching control for a second-level category displayed in the second region based on a status of the second-level category in the second region when the status of the product list meets the preset condition.

In the control apparatus for browsing a list of objects that is provided by the embodiment of the present disclosure, a provision module provides a list of products, where the list of products includes a first region and a second region. Multiple first-level categories are displayed in the first region, and multiple second-level categories are displayed in the second region. An acquisition module obtains a status of the list of products. A determination module determines whether the status of the list of products meets a preset condition, and a control module performs a switching control on a second-level category displayed in the second region based on a status of the second-level category displayed in the second region in response to the status of the list of products meeting the preset condition. In other words, in response to determining that the product list meets the preset condition and fulfills an automatic switching operation, a target category to be switched is determined based on a status of a second-level category that is currently displayed in the second region, so as to achieve an automatic switching between categories in a page, without a need of interrupting a browsing activity of a user, thus achieving the users' demand for barrier-free browsing in a better manner, and enhancing user experience. From the perspective of the page, categories in the page are differentiated clearly, and page performance is improved.

Additional aspects and advantages of the present disclosure are described hereinafter, and some portions thereof will become apparent from the following description or will be understood through implementations of the present disclosure.

BRIEF DESCRIPTION OF THE DRAWINGS

The foregoing and/or additional aspects and advantages of the present disclosure become apparent and are easily understood from descriptions of embodiments in combination with accompanying drawings as follows.

DETAILED DESCRIPTION

Embodiments of the present disclosure are described in detail herein. Examples of the embodiments are illustrated in the accompanying drawings, where the same or similar reference labels indicate the same or similar elements or elements having the same or similar function. The embodiments described herein with reference to the accompanying drawings are exemplary, with the aim of explaining the present disclosure, and should not be understood as limitations to the present disclosure.

A method and an apparatus for browsing of a list of objects according to the embodiments of the present disclosure are described herein with reference to the accompanying drawings.

Figure 1:
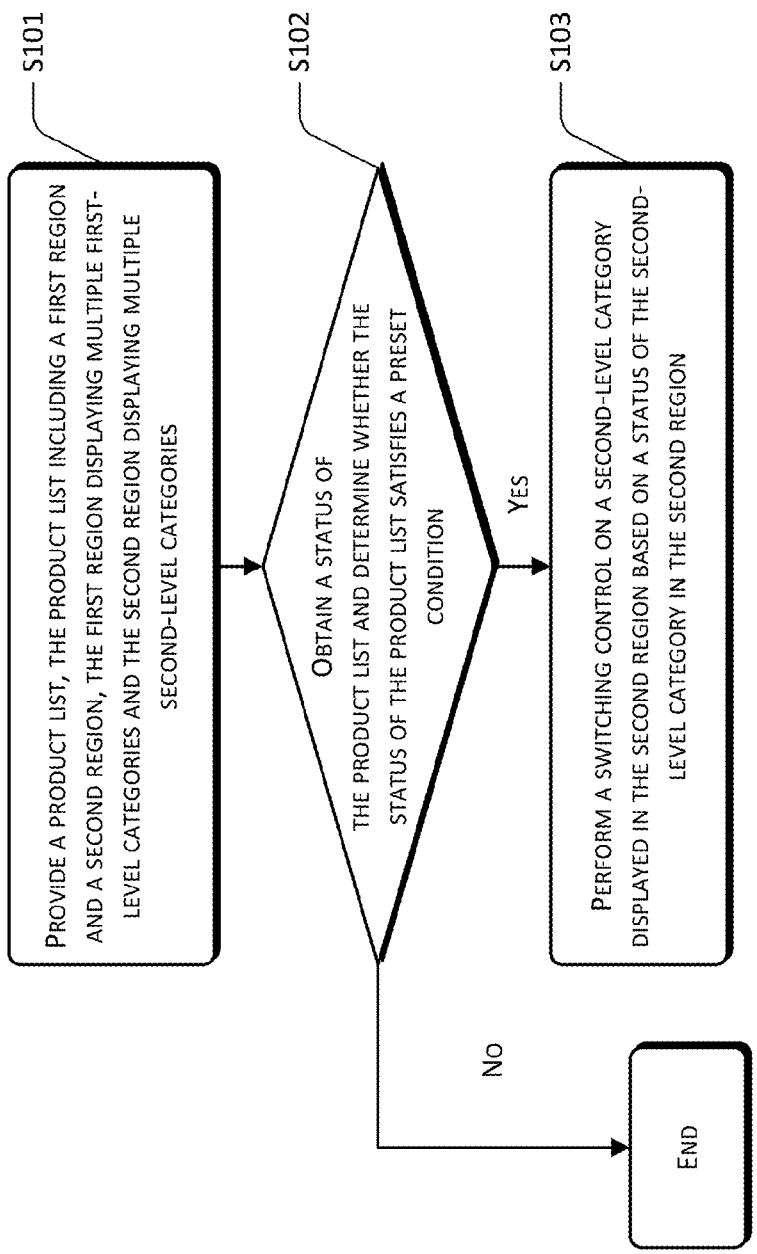
FIG. 1 is a flowchart illustrating a control method for browsing a list of objects according to an embodiment of the present disclosure.

FIG. 1 is a flowchart illustrating a method for browsing a list of objects according to an embodiment of the present disclosure. As shown in FIG. 1, the method for browsing a list of objects may include:

S101 provides a page (e.g., a webpage) containing a plurality of objects (e.g., products sold on an online platform), where the page includes a first region and a second region. Multiple first-level categories are displayed in the first region, and multiple second-level categories are displayed in the second region.

Figure 2A:
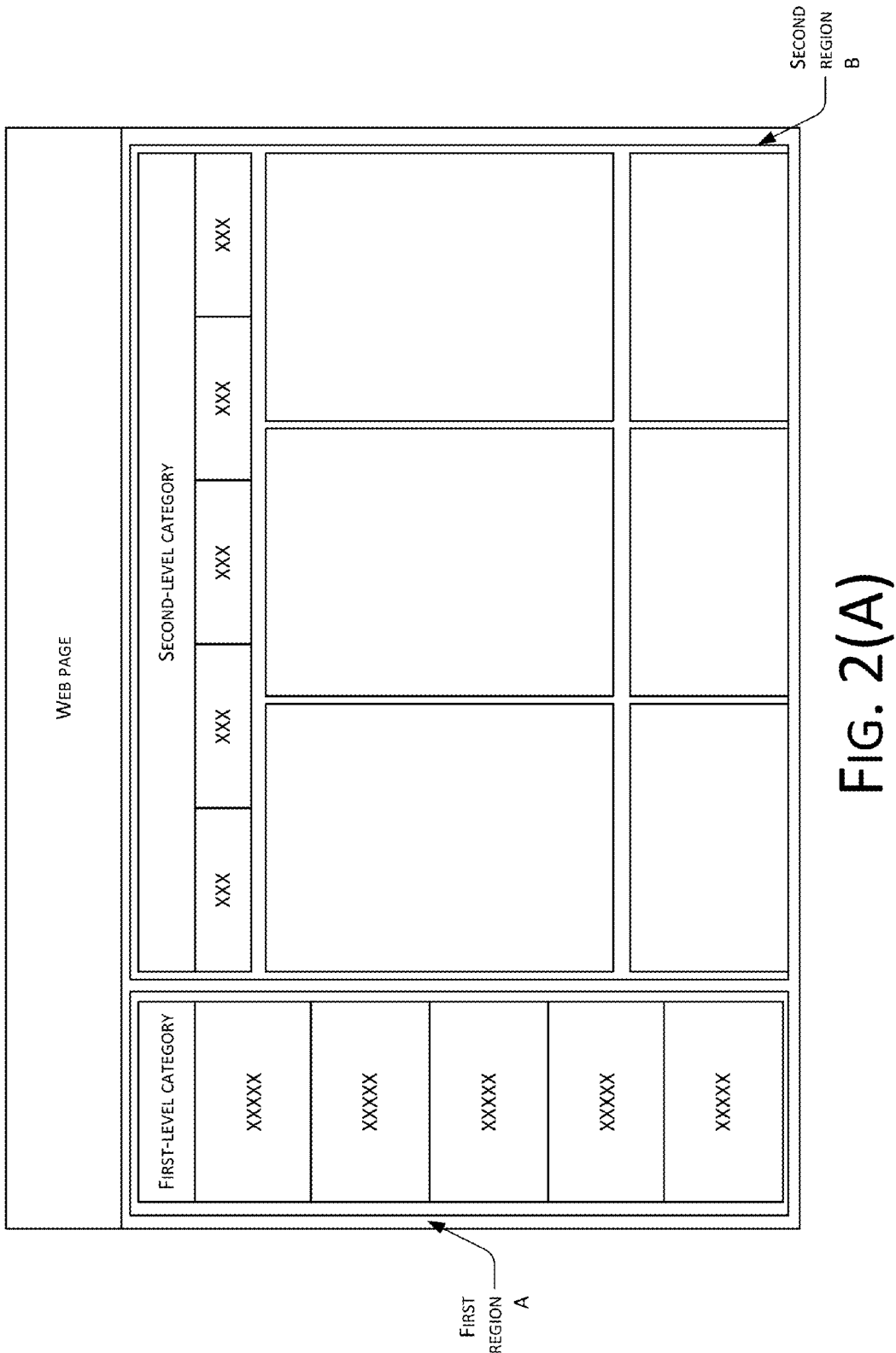
FIGS. 2(A) and (B) are schematic diagrams illustrating example displays of a page of a list of products according to an embodiment of the present disclosure.

For example, when a user opens and browses a page having a list of products through a browser, the browser may load the list of products corresponding to the page that is provided by a server, and provide the list of products to the user. In an implementation of the present disclosure, the list of products may include a first region and a second region. As shown in FIG. 2(A), multiple first-level categories may be displayed in the first region A, and multiple second-level categories may be displayed in the second region B. Each second-level category under a first-level category may individually include a product list.

S102 obtains a status of the list of products, and determines whether the status of the list of products meets a preset condition.

Figure 2B:
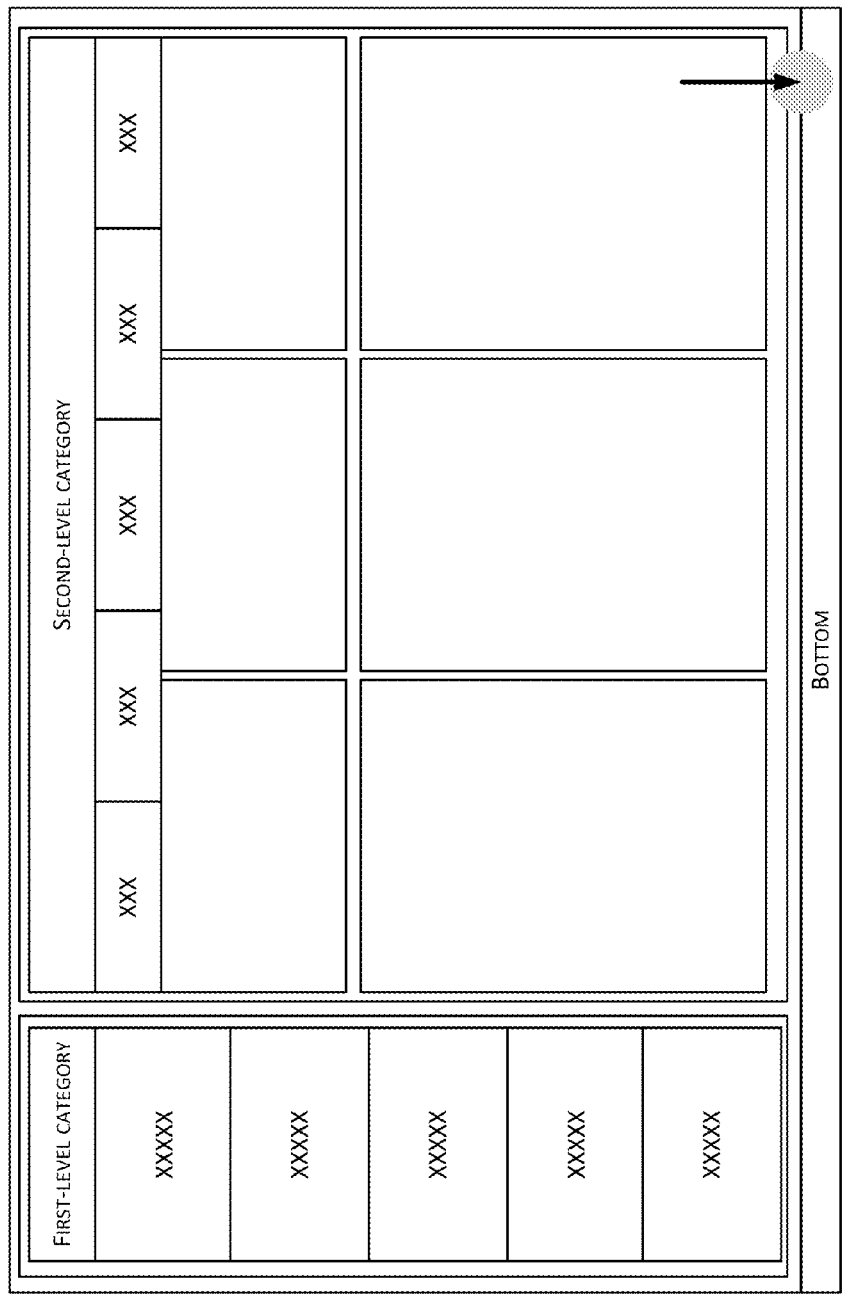

In an implementation of the present disclosure, the list of products may further include a scroll bar, and the status of the list of products may be understood as a status of the scroll bar. Specifically, in an implementation of the present disclosure, determining whether the status of the list of products meets a preset condition may include determining that the status of the list of products meets the preset condition when the scroll bar arrives at the bottom edge of a page (as shown in FIG. 2(B)). It can be understood that the status of the scroll bar in the page may be obtained through existing technologies, which is not described herein in detail.

S103 performs a switching control on a second-level category displayed in the second region based on a status of the second-level category in the second region in response to the status of the list of products meeting the preset condition.

Specifically, when the user browses a product list under a second-level category displayed in the second region of the page, a switching control is performed on the second-level category in the second region based on a status of the second-level category displayed in the second region if products under the current second-level category have all been loaded and the user continues to scroll to the bottom of the page. In an implementation of the present disclosure, the status of the second-level category may be understood as whether the second-level category is the last second-level category of a first-level category to which the second-level category belongs. Reference can be made to a detailed description of subsequent embodiments for an exemplary implementation.

Furthermore, in order to ensure that the user is able to browse as many products that are loaded in a current page as possible, in an implementation of the present disclosure, after the status of the list of products meets the preset condition, the browsing control method for a list of objects may further include determining whether products corresponding to the second-level category in the second region have been loaded; determining whether a time of duration is greater than a preset time if the products corresponding to the second-level category in the second region have been loaded; and performing a switching control for the second-level category in the second region based on the status of the second-level category displayed in the second region in an event that the time of duration is greater than the preset time.

Specifically, after the scroll bar arrives at the bottom of the page, a determination is first made as to whether products under a current second-level category have all been loaded in the second region. If the products have not all been loaded, loading of the products continues until the products under the current second-level category have all been loaded. If the products under the current second-level category have all been loaded, a determination is further made as to whether a time of duration from a previous loading of products or automatic category switching is greater than a preset time (for example, two seconds, etc.). If affirmative, a switching control is further performed on the second-level category in the second region based on a status of the current second-level category. It should be noted that, by setting the preset time (for example, two seconds or the like) as a buffer time in this implementation of the present disclosure, an occurrence of a situation in which the last batch of products for the page is just loaded into the page and may not be browsed by the user can be avoided, thus ensuring that the user is able to browse the products that are loaded into the current page as many as possible.

It should also be noted that products corresponding to a second-level category may be loaded in the second region in a cascading manner in an implementation of the present disclosure. This thus enables the user to obtain more information within a short period of time. Furthermore, as the cascading has a lazy loading mode, a page-down operation of the user by mouse clicking may also be avoided by setting the lazy loading mode, thus enhancing user experience.

In the control method for browsing a list of objects that is provided by the embodiment of the present disclosure, a product list may be provided. The product list may include a first region and a second region. Multiple first-level categories are displayed in the first region, and multiple second-level categories are displayed in the second region. A status of the product list may be obtained, and a determination may be made as to whether the status of the product list meets a preset condition. In an event that the status of the product list meets the preset condition, a switching control may be performed for a second-level category displayed in the second region based on a status of the second-level category in the second region. In other words, in response to determining that the product list meets the preset condition and fulfills an automatic switching operation, a target category to be switched is determined based on a status of a second-level category that is currently displayed in the second region, so as to achieve an automatic switching between categories in a page, without a need of interrupting a browsing activity of a user, thus achieving the users' demand for barrier-free browsing in a better manner, and enhancing user experience. From the perspective of the page, categories in the page are differentiated clearly, and page performance is improved.

Figure 3:
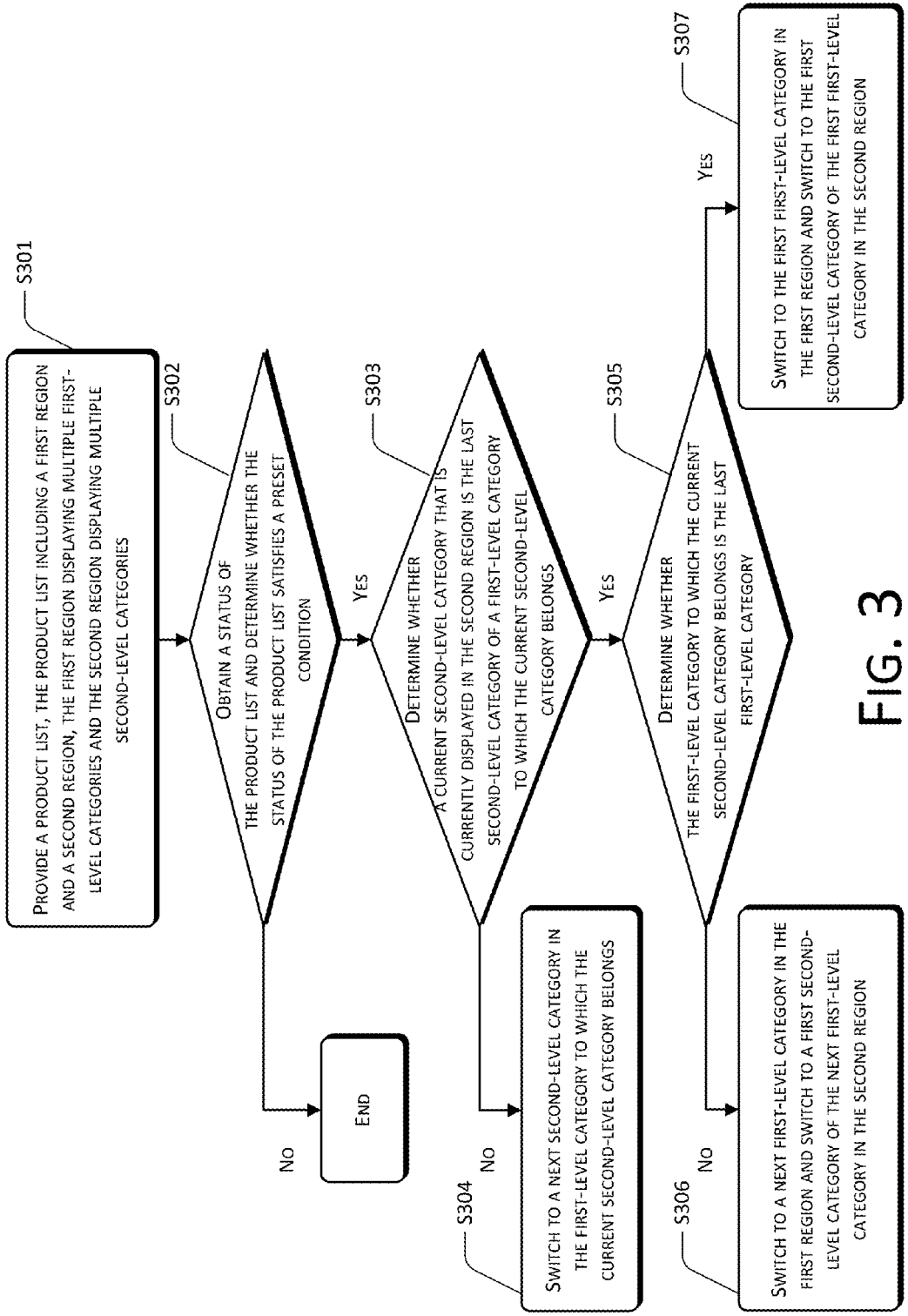
FIG. 3 is a flowchart illustrating a control method for browsing a list of objects according to another embodiment of the present disclosure.

FIG. 3 is a flowchart of a control method for browsing a list of objects according to another embodiment of the present disclosure.

In order to enable a user to circularly traverse and browse all products in a page without hindrance, in an implementation of the present disclosure, a determination is first made as to whether a current second-level category that is currently displayed in a second region is the last second-level category of a first-level category to which the current second-level category belongs. An automatic switching control or other corresponding operations may then be performed based on a determination result. Specifically, as shown in FIG. 3, the control method for browsing a list of objects may include:

S301 provides a product list, where the product list includes a first region and a second region. Multiple first-level categories are displayed in the first region, and multiple second-level categories are displayed in the second region.

For example, when a user opens and browses a page having a list of products through a browser, the browser may load the list of products corresponding to the page that is provided by a server, and provide the list of products to the user. In an implementation of the present disclosure, the list of products may include a first region and a second region. As shown in FIG. 2(A), multiple first-level categories may be displayed in the first region A, and multiple second-level categories may be displayed in the second region B. Each second-level category under a first-level category may individually include a product list.

S302 obtains a status of the list of products, and determines whether the status of the list of products meets a preset condition.

In an implementation of the present disclosure, the list of products may further include a scroll bar, and the status of the list of products may be understood as a status of the scroll bar. Specifically, in an implementation of the present disclosure, determining whether the status of the list of products meets a preset condition may include determining that the status of the list of products meets the preset condition when the scroll bar arrives at the bottom of a page (as shown in FIG. 2(B)). It can be understood that the status of the scroll bar in the page may be obtained through existing technologies, which is not redundantly described herein.

S303 determines whether a current second-level category that is currently displayed in the second region is the last second-level category of a first-level category to which the current second-level category belongs in response to the status of the list of products meeting the preset condition.

S304 switches to a next second-level category in the first-level category to which the current second-level category belongs, in an event that the current second-level category is not the last second-level category of the first-level category to which the current second-level category belongs.

S305 determines whether the first-level category to which the current second-level category belongs is the last first-level category, in an event that the current second-level category is the last second-level category of the first-level category to which the current second-level category belongs.

S306 switches to a next first-level category in the first region and switches to a first second-level category of the next first-level category in the second region, in an event that the first-level category to which the current second-level category belongs is not the last first-level category.

S307 switches to the first first-level category in the first region and switches to the first second-level category of the first first-level category in the second region, in an event that the first-level category to which the current second-level category belongs is the last first-level category.

Figure 4:
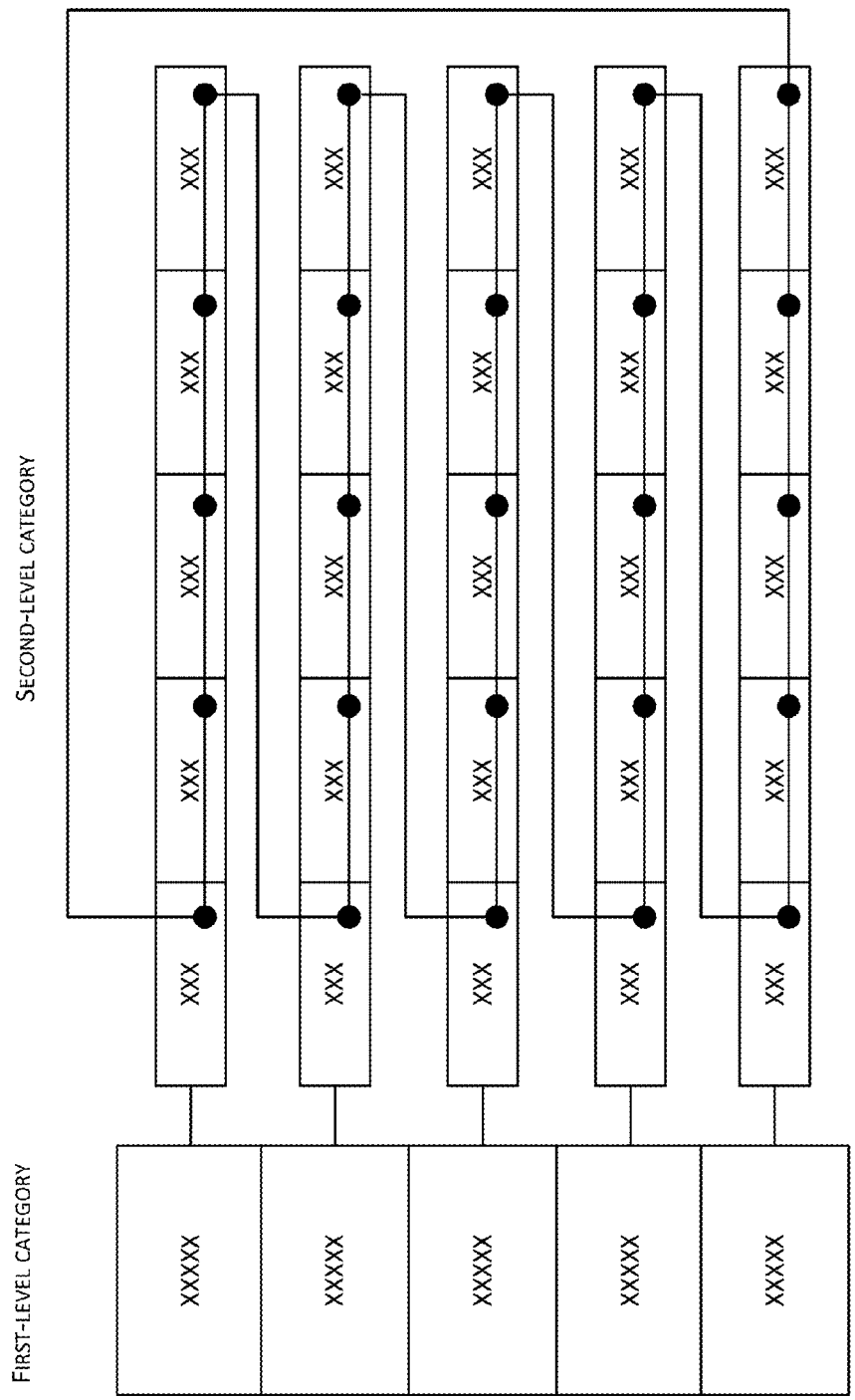
FIG. 4 is a schematic diagram illustrating an example control method for browsing a list of objects according to an embodiment of the present disclosure.

For example, three first-level categories may be displayed in the first region, which are A1 first-level category, B2 first-level category and C3 first-level category respectively. Second-level categories under the A1 first-level category are a1 second-level category, a2 second-level category and a3 second-level category respectively. Second-level categories under the B2 first-level category are b1 second-level category, b2 second-level category and b3 second-level category respectively. Second-level categories under the C3 first-level category are c1 second-level category and c2 second-level category respectively. In an example, when the scroll bar arrives at the bottom of the page, if a current second-level category (a3) that is currently displayed in the second region is determined to be the last second-level category of the first-level category (A1) to which the current second-level category (a3) belongs, a determination is further made as to whether the first-level category (A1) to which the current second-level category (a3) belongs is the last first-level category. If not, a switching to a next first-level category (B2) in the first region, and a switching to the first second-level category (b1) of the next first-level category (B2) in the second region are performed. For another example, if a determination is made that a current second-level category (a2) that is currently displayed in the second region is not the last second-level category of the first-level category (A1) to which the current second-level category (a2) belongs, a switching to a next second-level category (a3) of the first-level category (A1) to which the current second-level category (a2) belongs is performed. For another instance, upon determining that the first-level category (C3) to which a current second-level category (c2) belongs is the last first-level category, a switching to the first first-level category (A1) in the first region, and a switching to the first second-level category (a1) of the first first-level category (A1) in the second region are performed. FIG. 4 is a schematic diagram of an example of a control method for browsing a list of objects according to an embodiment of the present disclosure. A user begins browsing from any node as shown in FIG. 4, and is able to traverse and browse each product in a page in a rotating manner without hindrance and without the need of manual switching by the user in an entire process, thus avoiding an interruption of browsing activities due to the manual switching, reducing the number of operations of the user and enhancing user experience.

In accordance with the control method for browsing a list of objects according to the embodiments of the present disclosure, when a status of a scroll bar meets a preset condition, a determination may first be made as to whether a current second-level category that is currently displayed in a second region is the last second-level category of a first-level category to which the current second-level category belongs. If not, a switching to a next second-level category of the first-level category to which the current second-level category belongs is performed. If affirmative, a determination is further made as to whether the first-level category to which the current second-level category belongs is the last first-level category. If not, a switching to a next first-level category in the first region, and a switching to the first second-level category of the next first-level category in the second region are performed. Otherwise, a switching to the first first-level category in the first region, and a switching to the first second-level category of the first first-level category in the second region are performed. A user is able to begin browsing from any node in a page, thus enabling the user to circularly traverse and browse all products in the page without any hindrance.

Figure 5:
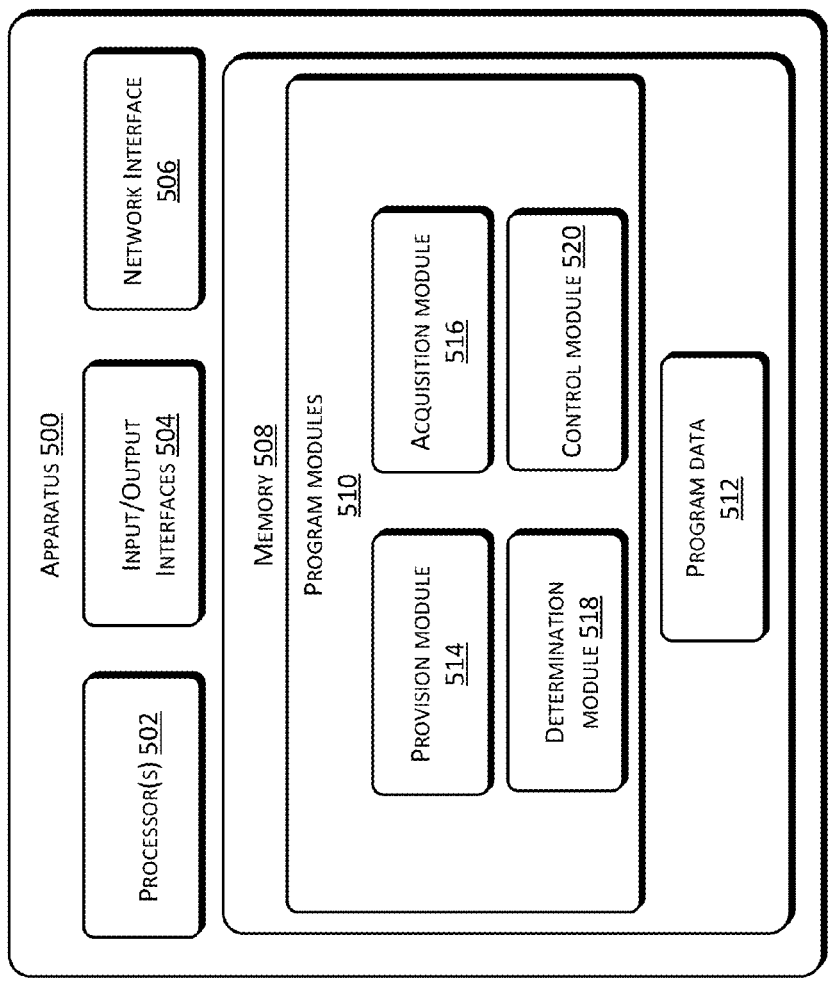
FIG. 5 is a structural diagram illustrating a control apparatus for browsing a list of objects according to an embodiment of the present disclosure.

Corresponding to the control method for browsing a list of objects as provided in the foregoing embodiments, an embodiment of the present disclosure further provides a control apparatus for browsing a list of objects. Since the control apparatus for browsing a list of objects provided in the embodiment of the present disclosure corresponds to the control method for browsing a list of objects provided in the foregoing embodiments, the implementations of the control method for browsing a list of objects are also applicable to the control apparatus for browsing a list of objects provided in this embodiment, and thus are not described in detail in this embodiment. FIG. 5 is a structural diagram of a control apparatus 500 for browsing a list of objects according to an embodiment of the present disclosure. As shown in FIG. 5, the control apparatus 500 may include, but is not limited to, one or more processors 502, an input/output interface 504, a network interface 506, and memory 508.

The memory 508 may include a form of computer readable media, e.g., a non-permanent storage device, random-access memory (RAM) and/or a nonvolatile internal storage, such as read-only memory (ROM) or flash RAM. The memory 508 is an example of computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The memory 508 may include program modules 510 and program data 512. The program modules 510 may include a provision module 514, an acquisition module 516, a determination module 518 and a control module 520.

In an implementation, the provision module 514 may provide a product list, where the product list includes a first region and a second region. Multiple first-level categories are displayed in the first region, and multiple second-level categories are displayed in the second region. The acquisition module 516 may obtain a status of the product list. The determination module 518 may determine whether the status of the product list meets a preset condition. In an implementation of the present disclosure, the product list may further include a scroll bar, and the status of the product list may be understood as a status of the scroll bar. In an implementation of the present disclosure, the determination module 518 may determine that the status of the product list meets the preset condition in response to the scroll bar reaching at the bottom of a page (as shown in FIG. 2(B), for example).

The control module 520 may perform a switching control on a second-level category displayed in the second region in accordance with a status of the second-level category in the second region in response to the status of the product list meeting the preset condition. More specifically, when a user browses a list of products under a second-level category displayed in the second region in the page, if products under the current second-level category have all been loaded and the user continues to scroll to the bottom of the page, the control module 520 may perform a switching control on the second-level category in the second region in accordance with a status of the second-level category displayed in the second region. In an implementation of the present disclosure, the status of the second-level category may be understood as whether the second-level category is the last second-level category of the first-level category to which the second-level category belongs. Reference can be made to the detailed description of subsequent embodiments for an exemplary implementation.

Figure 6:
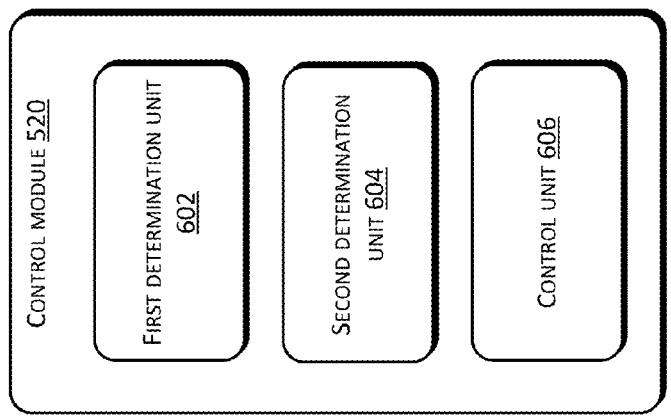
FIG. 6 is a structural diagram illustrating a control module according to an embodiment of the present disclosure.

Furthermore, in order to ensure that the user is able to browse all the products loaded in a current page as many as possible, in an implementation of the present disclosure, the control module 520 may include a first determination unit 602, a second determination unit 604 and a control unit 606 as shown in FIG. 6.

Specifically, the first determination unit 602 may determine whether products corresponding to the second-level category in the second region have been loaded in response to the status of the list of products meeting the preset condition. The second determination unit 604 may determine whether a time of duration is greater than a preset time if the products corresponding to the second-level category in the second region have been loaded. The control unit 606 may perform the switching control on the second-level category in the second region in accordance with the status of the second-level category displayed in the second region, in an event that the time of duration is greater than the preset time.

More specifically, after the scroll bar arrives at the bottom of the page, the first determination unit 602 may determine whether the products under the current second-level category have all been loaded in the second region, and continue loading the products until the products under the current second-level category have all been loaded if the products have not been all loaded. If the products under the current second-level category have all been loaded, the second determination unit 604 may determine whether a time of duration from a previous loading of products or automatic category switching is greater than a preset time (for example, two seconds, etc.). If affirmative, the control unit 606 may perform the switching control on the second-level category in the second region in accordance with the status of the current second-level category. It should be noted that, by setting the preset time (for example, two seconds or the like) as a buffer time in this implementation of the present disclosure, an occurrence of a situation in which the last batch of products for the page is just loaded into the page and may not be browsed by the user can be avoided, thus ensuring that the user is able to browse the products that are loaded into the current page as many as possible.

It should also be noted that the control module 520 may load the products corresponding to the second category into the second region in a cascading manner in an implementation of the present disclosure. This thus enables the user to obtain more information within a short period of time. Furthermore, as the cascading has a lazy loading mode, a page-down operation of the user by mouse clicking may also be avoided by setting the lazy loading mode, thus enhancing user experience.

Specifically, in order to enable the user to circularly traverse and browse all the products in the page without hindrance, in an implementation of the present disclosure, the control unit 606 may determine whether a current second-level category that is currently displayed in the second region is the last second-level category of a first-level category to which the current second-level category belongs, and switch to a next second-level category of the first-level category to which the current second-level category belongs in an event that the current second-level category is not the last second-level category of the first-level category to which the current second-level category belongs.

In an implementation of the present disclosure, the control unit 606 may further determine whether the first-level category to which the current second-level category belongs is the last first-level category in an event that the current second-level category is the last second-level category of the first-level category to which the current second-level category belongs; switch to a next first-level category in the first region and switch to the first second-level category of the next first-level category in the second region in an event that the first-level category to which the current second-level category belongs is not the last first-level category; and switch to the first first-level category in the first region and switch to the first second-level category of the first first-level category in the second region in an event that the first-level category to which the current second-level category belongs is the last first-level category.

For example, three first-level categories may be displayed in the first region, which are A1 first-level category, B2 first-level category and C3 first-level category respectively. Second-level categories under the A1 first-level category are a1 second-level category, a2 second-level category and a3 second-level category respectively. Second-level categories under the B2 first-level category are b1 second-level category, b2 second-level category and b3 second-level category respectively. Second-level categories under the C3 first-level category are c1 second-level category and c2 second-level category respectively. In an example, when the scroll bar arrives at the bottom of the page, if a current second-level category (a3) that is currently displayed in the second region is determined to be the last second-level category of the first-level category (A1) to which the current second-level category (a3) belongs, a determination is further made as to whether the first-level category (A1) to which the current second-level category (a3) belongs is the last first-level category. If not, a switching to a next first-level category (B2) in the first region, and a switching to the first second-level category (b1) of the next first-level category (B2) in the second region are performed. For another example, if a determination is made that a current second-level category (a2) that is currently displayed in the second region is not the last second-level category of the first-level category (A1) to which the current second-level category (a2) belongs, a switching to a next second-level category (a3) of the first-level category (A1) to which the current second-level category (a2) belongs is performed. For another instance, upon determining that the first-level category (C3) to which a current second-level category (c2) belongs is the last first-level category, a switching to the first first-level category (A1) in the first region, and a switching to the first second-level category (a1) of the first first-level category (A1) in the second region are performed. FIG. 4 is a schematic diagram of an example of a control method for browsing a list of objects according to an embodiment of the present disclosure. A user begins browsing from any node as shown in FIG. 4, and is able to traverse and browse each product in a page in a rotating manner without hindrance and without the need of manual switching by the user in an entire process, thus avoiding an interruption of browsing activities due to the manual switching, reducing the number of operations of the user and enhancing user experience.

In the control apparatus for browsing a list of objects that is provided by the embodiment of the present disclosure, a provision module provides a list of products, where the list of products includes a first region and a second region. Multiple first-level categories are displayed in the first region, and multiple second-level categories are displayed in the second region. An acquisition module obtains a status of the list of products. A determination module determines whether the status of the list of products meets a preset condition, and a control module performs a switching control on a second-level category displayed in the second region based on a status of the second-level category displayed in the second region in response to the status of the list of products meeting the preset condition. In other words, in response to determining that the product list meets the preset condition and fulfills an automatic switching operation, a target category to be switched is determined based on a status of a second-level category that is currently displayed in the second region, so as to achieve an automatic switching between categories in a page, without a need of interrupting a browsing activity of a user, thus achieving the users' demand for barrier-free browsing in a better manner, and enhancing user experience. From the perspective of the page, categories in the page are differentiated clearly, and page performance is improved.

In the description of the present specification, reference terms such as "an embodiment", "embodiments", "an example", "a specific example" or "examples", etc., indicate that specific features, structures, materials or characteristics that are described in combination with the embodiment(s) or example(s) are included in at least one embodiment or example of the present disclosure. In the present specification, schematic representations of the foregoing terms are not necessarily directed to a same embodiment or example. Moreover, the specific features, structures, materials or characteristics described may be combined in a suitable manner in any one or more of the embodiments or examples. In addition, one skilled in the art can combine and group different embodiments or examples and features of different embodiments or examples described in the present specification together in a situation where no conflict exists.

In addition, terms "first" and "second" are merely used for the purpose of description, and should not be understood as an indication or implication of a relative importance or an implicit indication of the number of indicated technical features. Thus, features defined with "first" and "second" may explicitly or implicitly include at least one of the features. In the description of the present disclosure, the meaning of "multiple" is at least two, for example, two, three, etc., unless apparently and specifically defined otherwise.

Any process or method in a flowchart or described in other manners herein can be understood as indicating one or more modules, fragments or parts of codes that include executable instructions used for implementing a specific logical function or process. Furthermore, the scope of exemplary implementations of the present disclosure includes other implementations, where functions may not be performed according to an order illustrated or discussed herein, which include performing the involved functions substantially in parallel or in a reverse order. This should be understood by one skilled in the art to which the embodiments of the present disclosure belong.

Logics and/or blocks represented in the flowcharts or described in other manners herein, for example, can be considered as a sequence of executable instructions used for implementing logical functions, and can be particularly implemented in any computer readable media for use by an instruction execution system, apparatus or device (e.g., a computer-based system, a system including processor(s), or other system that is able to read and execute instructions from the instruction execution system, apparatus or device), or to be used in combination with the instruction execution system, apparatus or device. In the present specification, "computer readable media" may be any apparatus that is able to include, store, communicate, propagate or transmit a program to be used by an instruction execution system, apparatus or device or to be used in combination with the instruction execution system, apparatus or device. Specific examples (a non-exhaustive list) of the computer readable media may include an electrical connecting portion (an electronic apparatus) having one or more wires, a portable computer disk box (a magnetic apparatus), random access memory (RAM), read-only memory (ROM), an erasable programmable read-only memory (EPROM or flash memory), an optical fiber apparatus, and portable compact disc read-only memory (CDROM). In addition, the computer readable media may even be a piece of paper on which the program can be printed or another suitable medium, because the program can be obtained, for example, by performing optical scanning on the paper or another medium, and then in an electrical manner, manipulating, decoding or processing in other suitable way, which is then stored in a computer storage device.

It should be understood that various parts of the present disclosure can be implemented in hardware, software, firmware or a combination thereof. In the foregoing implementations, multiple method blocks or methods can be implemented by software or firmware which is stored in memory and executed by a suitable instruction execution system. For example, if hardware is used for implementation, the implementation can be achieved as in another implementation by using any one of the following technologies or a combination thereof: a discreet logic circuit which has a logic gate circuit used for implementing a logical function on a data signal, a designated integrated circuit which has a suitable combinational logic gate circuit, a programmable gate array (PGA), a field programmable gate array (FPGA), etc.

One of ordinary skill in the art can understand that implementations of all or part of the method blocks includes in the foregoing method embodiments can be achieved by instructing relevant hardware through a program. The program may be stored in a computer readable media, and the program, when executed, includes one or more of the method blocks of the method embodiment(s).

In addition, the functional units in the embodiments of the present disclosure may be integrated into a single processing module. In an alternative implementation, each of the units may exist in a physical form independently. In an alternative implementation, two or more units may be integrated into a single module. The integrated module may be implemented in a form of hardware, or may be implemented in a form of a software functional module. If implemented in a form of a software functional module and sold or used as a separate product, the integrated module may be stored in a computer readable storage media.

The storage media mentioned above may be read-only memory, a magnetic disk, an optical disc, or the like. Although the embodiments of the present disclosure have been illustrated and described above, it can be understood that the embodiments are exemplary, and should not be construed as limitations of the present disclosure. One of ordinary skill in the art may perform changes, modifications, replacement and transformation to the embodiments within the scope of the present disclosure.

What is claimed is:

1. A method implemented by one or more computing devices, the method comprising:
provide a page containing a plurality of objects, wherein the page includes a first region displaying multiple first-level categories and a second region displaying multiple second-level categories;
obtaining a status of the objects;
determining whether the status of the objects satisfies a preset condition; and
performing an automatic switching control on;
a current second-level category displayed in the second region by:
determining whether the current second-level category displayed in the second region is a last second-level category of a plurality of second-level categories under a first-level category to which the current second-level category belongs,
automatically switching to a next second-level category of the first-level category to which the current second-level category belongs in response to determining that the current second-level category displayed in the second region is not the last second-level category of the plurality of second-level categories under the first-level category to which the current second-level category displayed in the second region belongs,
determining whether the first-level category to which the current second-level category belongs is a last first-level category of the multiple first-level categories in response to determining that the current second-level category is the last second-level category of the plurality of second-level categories under the first-level category to which the current second-level category belongs, and
automatically switching to a next first-level category in the first region and switching to a first second-level category of the next first-level category in the second region in response to determining that the first-level category to which the current second-level category belongs is not the last first-level category of the multiple first-level categories, or
a current first-level category displayed in the first region in response to determining that the status of the objects satisfies the preset condition.

2. The method of claim 1, wherein the page further comprises a scroll bar, and determining whether the status of the objects satisfies the preset condition comprises determining that the preset condition is satisfied in response to determining that the scroll bar arrives at an edge of a page.

3. The method of claim 1, further comprising determining whether all objects corresponding to the current second-level category in the second region have been loaded.

4. The method of claim 3, further comprising:
determining whether a time of duration is greater than a preset time in response to determining that all the objects corresponding to the current second-level category in the second region have been loaded; and
performing the automatic switching control on the current second-level category displayed in the second region or the current first-level category displayed in the first region in response to determining that the time of duration is greater than the preset time.

5. The method of claim 1, further comprising automatically switching to a first first-level category of the multiple first-level categories in the first region and switching to a first second-level category of a plurality of second-level categories of the first first-level category of the multiple first-level categories in the second region in response to determining that the first-level category to which the current second-level category belongs is the last first-level category of the multiple first-level categories.

6. The method of claim 1, further comprising loading objects corresponding to the current second-level category into the second region in a cascading manner.

7. One or more computer readable media storing executable instructions that, when executed by one or more processors, cause the one or more processors to perform acts comprising:
providing a page containing a plurality of objects, wherein the page includes a first region displaying multiple first-level categories and a second region displaying multiple second-level categories;
obtaining a status of the objects;
determining whether the status of the objects satisfies a preset condition; and
performing an automatic switching control on;
a current second-level category displayed in the second region by:
determining whether the current second-level category displayed in the second region is a last second-level category of a plurality of second-level categories under a first-level category to which the current second-level category belongs,
automatically switching to a next second-level category of the first-level category to which the current second-level category belongs in response to determining that the current second-level category displayed in the second region is not the last second-level category of the plurality of second-level categories under the first-level category to which the current second-level category displayed in the second region belongs,
determining whether the first-level category to which the current second-level category belongs is a last first-level category of the multiple first-level categories in response to determining that the current second-level category is the last second-level category of the plurality of second-level categories under the first-level category to which the current second-level category belongs, and
automatically switching to a next first-level category in the first region and switching to a first second-level category of the next first-level category in the second region in response to determining that the first-level category to which the current second-level category belongs is not the last first-level category of the multiple first-level categories, or
a current first-level category displayed in the first region in response to determining that the status of the objects satisfies the preset condition.

8. The one or more computer readable media of claim 7, wherein the page further comprises a scroll bar, and determining whether the status of the objects satisfies the preset condition comprises determining that the preset condition is satisfied in response to determining that the scroll bar arrives at an edge of a page.

9. The one or more computer readable media of claim 7, the acts further comprising determining whether all objects corresponding to the current second-level category in the second region have been loaded.

10. The one or more computer readable media of claim 9, the acts further comprising:
determining whether a time of duration is greater than a preset time in response to determining that all the objects corresponding to the current second-level category in the second region have been loaded; and
performing the automatic switching control on the current second-level category displayed in the second region or the current first-level category displayed in the first region in response to determining that the time of duration is greater than the preset time.

11. The one or more computer readable media of claim 7, the acts further comprising automatically switching to a first first-level category of the multiple first-level categories in the first region and switching to a first second-level category of a plurality of second-level categories of the first first-level category of the multiple first-level categories in the second region in response to determining that the first-level category to which the current second-level category belongs is the last first-level category of the multiple first-level categories.

12. The one or more computer readable media of claim 7, the acts further comprising loading objects corresponding to the current second-level category into the second region in a cascading manner.

13. An apparatus comprising:
one or more processors; and
memory coupled to the one or more processors, the memory storing a plurality of modules and units that are executable by the one or more processors, the plurality of modules and units including;
a provision module, via the one or more processors, configured to provide a page containing a plurality of objects, wherein the page includes a first region displaying multiple first-level categories and a second region displaying multiple second-level categories;
an acquisition module, via the one or more processors, configured to obtain a status of the objects;
a determination module, via the one or more processors, configured to determine whether the status of the objects meets a preset condition; and
a control module, via the one or more processors, configured to perform an automatic switching control on a current second-level category displayed in the second region or a current first-level category displayed in the first region in response to determining that the status of the objects satisfies the preset condition, the control module further comprising:
a first determination unit, via the one or more processors, configured to determine whether all objects corresponding to the current second-level category in the second region have been loaded in response to the status of the objects meeting the preset condition,
a second determination unit, via the one or more processors, configured to determine whether a time of duration is greater than a preset time if all the objects corresponding to the current second-level category in the second region have been loaded, and
a control unit, via the one or more processors, configured to perform the automatic switching control on the current second-level category in the second region in accordance with a status of the current second-level category displayed in the second region, in an event that the time of duration is greater than the preset time, the control unit further configured to:
determine whether the current second-level category displayed in the second region is a last second-level category of a first-level category to which the current second-level category belongs,
automatically switch to a next second-level category of the first-level category to which the current second-level category belongs in response to determining that the current second-level category displayed in the second region is not the last second-level category of the first-level category to which the current second-level category belongs,
determine whether the first-level category to which the current second-level category belongs is a last first-level category of the multiple first-level categories in response to determining that the current second-level category displayed in the second region is the last second-level category of the first-level category to which the current second-level category belongs,
automatically switch to a next first-level category in the first region, and switch to a first second-level category of the next first-level category in the second region in response to determining that the first-level category to which the current second-level category belongs is not the last first-level category of the multiple first-level categories, and
automatically switch to a first first-level category of the multiple first-level categories in the first region and switch to a first second-level category of the first first-level category of the multiple first-level categories in the second region in response to determining that the first-level category to which the current second-level category belongs is the last first-level category of the multiple first-level categories.

14. The apparatus of claim 13, wherein:
the page further comprises a scroll bar, and
the determination module, via the one or more processors, is further configured to determine the preset condition is satisfied in response to determining that the scroll bar arrives at an edge of a page.

15. The apparatus of claim 13, wherein the control module, via the one or more processors, is further configured to load objects corresponding to the current second-level category into the second region in a cascading manner.

* * * * *